United States Patent [19]

Ritter et al.

[11] Patent Number: 5,467,910
[45] Date of Patent: Nov. 21, 1995

[54] LOAD CARRYING FRAME FOR VEHICLES

[76] Inventors: Donald H. Ritter, 2075 Wildwood Dr., Cedarburg, Wis. 53012; Daniel S. Ritter, N. 70, W. 5528 Bridge, Cedarburg, Wis. 53012

[21] Appl. No.: 282,370

[22] Filed: Jul. 29, 1994

[51] Int. Cl.$^6$ .................................................. B60R 9/06
[52] U.S. Cl. ........................ 224/499; 224/282; 224/502
[58] Field of Search ................... 224/282, 42.03, 224/42.06, 42.07, 42.08, 42.43, 42.44, 42.45 R, 42.46, 42.03 A, 42.03 R, 280; 37/197, 231, 232, 235

[56] References Cited

U.S. PATENT DOCUMENTS

| | | | |
|---|---|---|---|
| 1,865,365 | 6/1932 | Foote | 224/42.44 |
| 3,334,761 | 8/1967 | Perri | 224/42.08 |
| 3,604,517 | 9/1971 | Clifford | 172/225 |
| 4,813,164 | 3/1989 | Morrell | 37/321 |
| 4,907,357 | 3/1990 | Lilienthal | 37/197 |
| 4,932,703 | 6/1990 | Chamberlin et al. | 224/42.03 |
| 5,081,775 | 1/1992 | Veillezuy | 37/197 |
| 5,092,503 | 3/1992 | Cocks | 224/42.07 |
| 5,155,929 | 10/1992 | Vachun | 37/266 |
| 5,193,296 | 3/1993 | Reilley | 37/231 |

*Primary Examiner*—Henry J. Recla
*Assistant Examiner*—Gregory M. Vidovich
*Attorney, Agent, or Firm*—David L. Baker; Rhodes & Ascolillo

[57] ABSTRACT

A load carrying platform for vehicles having a front or rear mounted plow frame including, a rectangular metal frame with connecting ears that mate with the connecting ears of the plow frame in a hinged relation and elevate the frame to approximately bumper level and a pair of chains that attach to the outer edge of the fame and connect to the top of the plow frame for support.

2 Claims, 3 Drawing Sheets

5,467,910

LOAD CARRYING FRAME FOR VEHICLES

BACKGROUND OF THE INVENTION

1. Field of the Invention

This invention relates generally to motor vehicles and in particular to motor vehicles that are equipped with plow frames and more particularly snow plow frames.

2. Description of the Prior Art

In areas of the country where winter includes cold weather and persistent snow fall on a regular basis, an industry has evolved that is formed of hundreds of individuals with small trucks equipped with snow plows. Operators generally have a plow frame attached to a new pickup truck and carry it all year round and only attach the plow blade when a storm is predicted or when the first flakes begin to fall. The plow frame is usually welded to the frame of the truck and includes a plate extending from below the bumper containing ears that accept members from the plow blade and the two form a hinged connection with the addition of a simple pin. Attached to the frame is the lift mechanism that raises and lowers the blade and includes a hydraulic ram and a support for auxiliary headlights used when the blade is raised, covering the vehicle headlights. The truck front suspension is usually reinforced to carry the additional weight.

Examples of vehicle plow frames are shown in the following U.S. Pat. No. 3,604,517 issued Sep. 14, 1971 to Clifford shows a garden type tractor with a plow frame. U.S. Pat. No. 4,907,357 issued Mar. 13, 1990 to Lilienthal discloses a plow system where plow blades are mounted on both the front and rear of a small truck. Veilleux, in U.S. Pat. No. 5,081,775 issued Jan. 21, 1992 presents a plow attaching device but discloses clearly the normal and usual means for attaching snow plows to trucks. Other snow plow attachment means are shown in the U.S. Pat. No. 5,155,929 to Vachon issued Oct. 20, 1992 and Reilley U.S. Pat. No. 5,193,296 issued Mar. 16, 1993.

The prior art, as known to the Applicant, fails to show a load carrying platform that is specifically adapted to be connected to the plow frame for carrying items that maybe of substantial weight and either inconvenient or incapable of being lifted into the rear of the vehicle under the prevailing circumstances.

SUMMARY OF THE INVENTION

The invention is directed to a platform that is connected to and supported by a conventional vehicle mounted snow plow frame. The platform is adapted to be used anytime the plow blade is unattached and separated from the vehicle. A particular feature of the platform is it's height above the ground in the sense that it is closer to the ground than the conventional tailgate and hence makes it easier to load heavy items that may have to be physically manhandled in the event a lifting device is not available. An example would be moving a heavy animal out of the woods in a hunting situation. The vehicle could drive up a woods road and pick up the animal and carry it to a point where help could be garnered to lift it into the back of the truck.

In addition to simply carrying large, heavy items the platform could also support a box of tools or fishing tackle as in the case of surf fishing where trucks are driven out to waters edge.

It is therefore an object of the invention to provide a new and improved load carrying platform for vehicles.

It is another object of the invention to provide a new and improved load carrying platform for vehicles that conveniently attaches to the pre-existing connection points of a snow plow frame.

It is a further object of the invention to provide a new and improved load carrying platform that is low in cost.

It is still another object of the invention to provide a new and improved load carrying platform which is of a durable and reliable construction.

It is still a further object of the invention to provide a new and improved load carrying platform which may be easily and efficiently manufactured and marketed.

These and other advantages, features and objects of the invention will become more apparent from the following description taken in connection with the illustrative embodiment in the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENT

Figure 1:
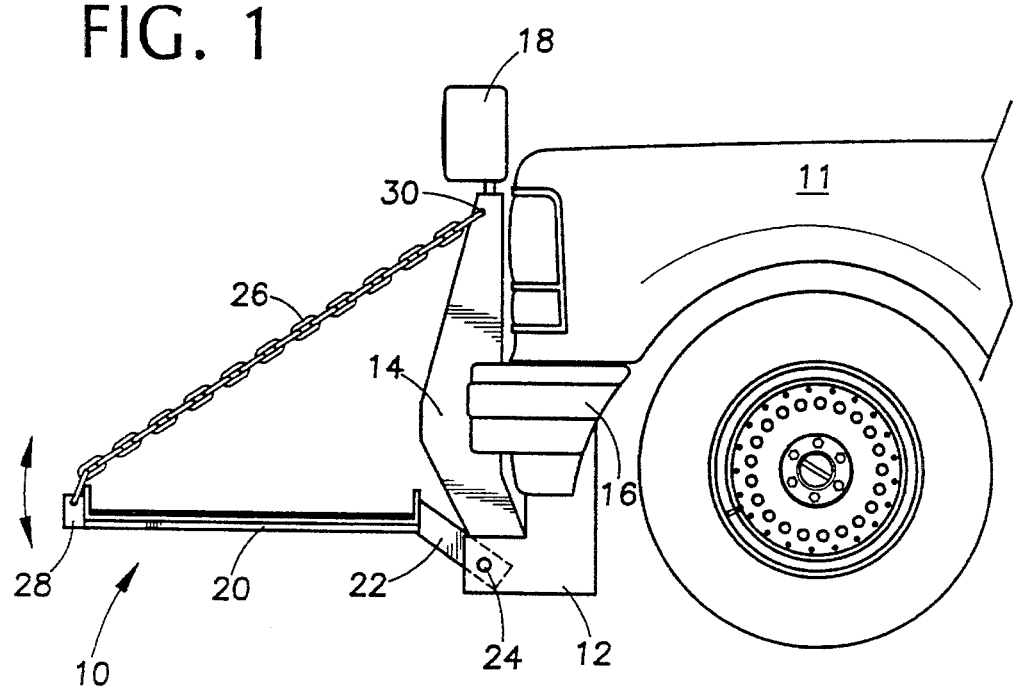
FIG. 1 is a side elevation view of the platform mounted on a vehicle.
Figure 2:
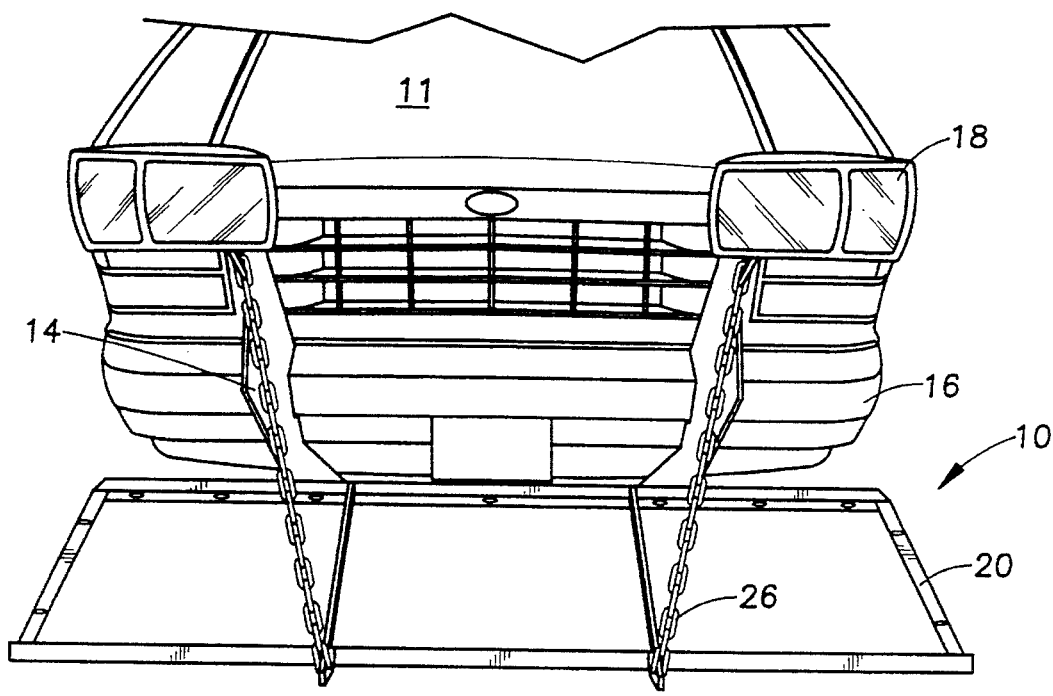
FIG. 2 is a perspective view of the platform mounted on a vehicle.

Referring now to FIGS. 1 and 2, the load carrying platform is shown generally at 10 connected to a vehicle 11 having inferior plow frame 12 and superior plow frame 14. The vehicle bumper is shown at 16. Auxiliary headlights are attached and mounted on the superior plow frame at 18. The platform frame 20 is connected to the inferior plow frame 12 by arms 22 which are secured by pins 24. Chain 26 is connected to the distal portion of the platform frame and is connected to the provided connecting apertures 28 and apertures 30 on the superior plow frame 14.

The connecting arms are attached to the platform frame at an acute angle to the horizontal there by raising the height of the platform and allowing more ground clearance than would be achieved if the arms were simply attached parallel to the ground surface. The pin connection between the arms 22 and the plow frame 12 create a hinge relation and as a result the platform is capable of swinging down to ground level upon release of the chains 26. The advantage of the hinge effect is to allow heavy objects to be rolled or dragged on to the platform then the platform raised with the use of available hand tools. Another feature of the hinged designed is that the platform may be raised and adjusted out of the way when not needed and lowered only when actually used.

Figure 3:
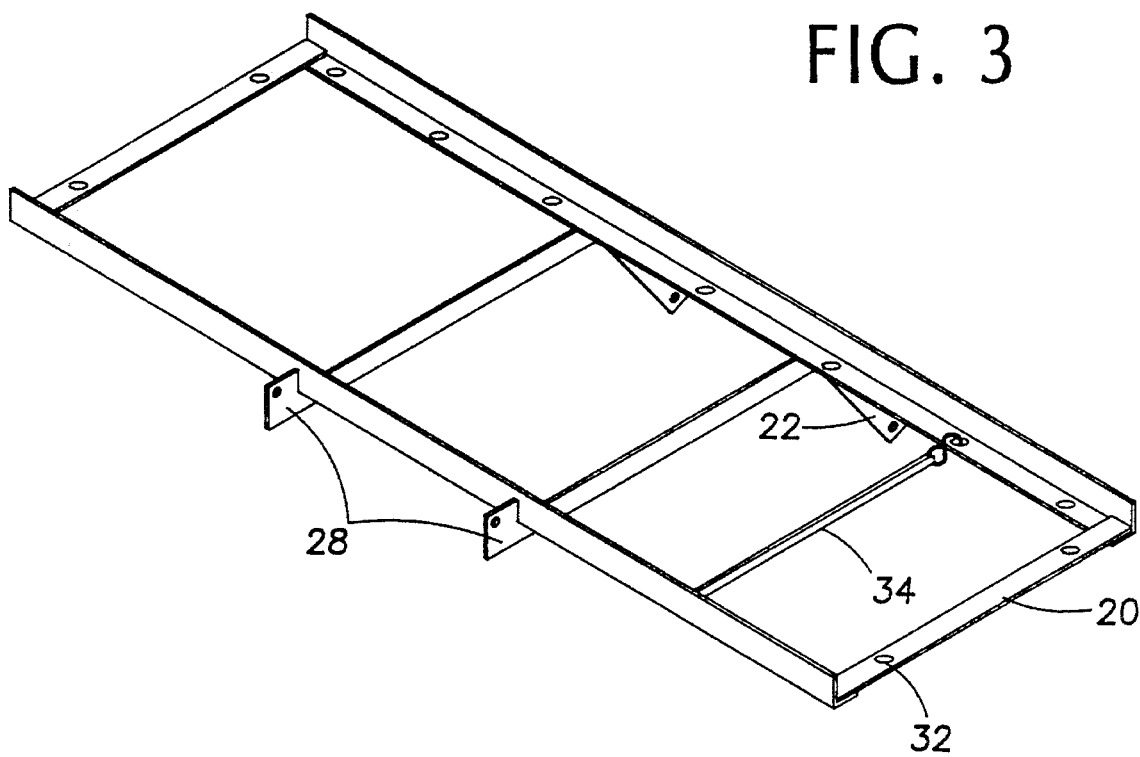
FIG. 3 is a perspective view of the platform showing the front side.
Figure 4:
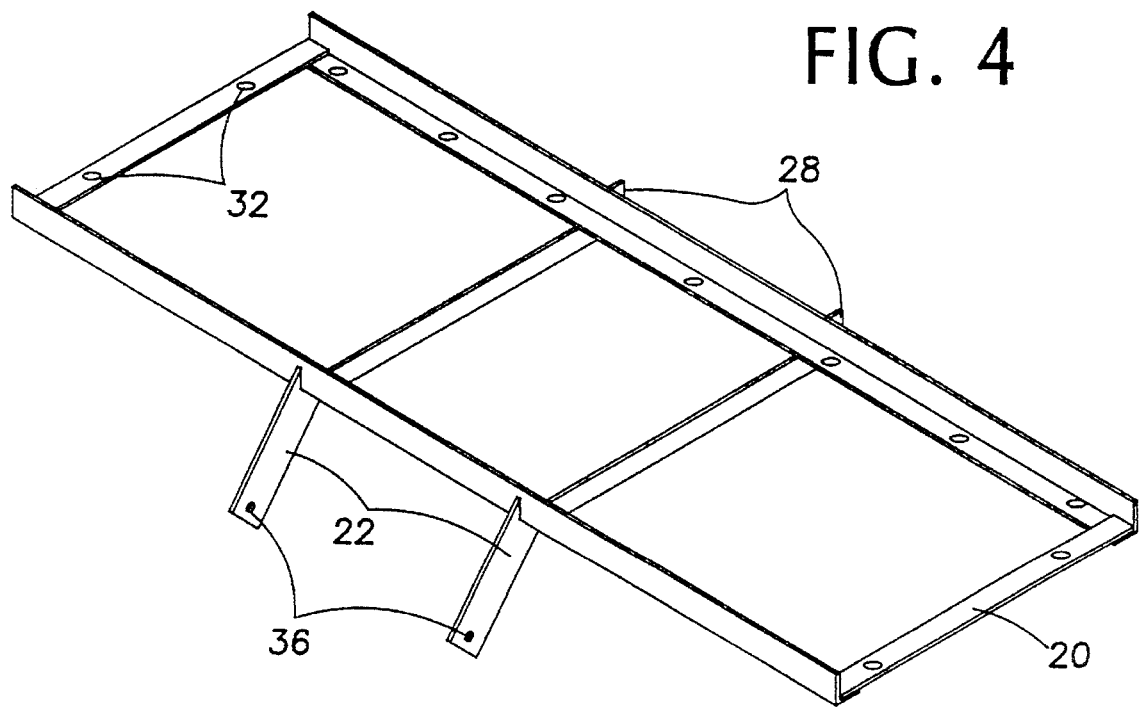
FIG. 4 is a perspective view of the platform showing the back side.

Referring now to FIGS. 3 and 4 the frame 20 is provided with a plurality of apertures 32 adapted to secure the ends of tie-down straps 34 for holding the load in place while the vehicle is moving. The figures show the ends of the frame to be formed from flat stock and the sides from angle iron, however it should be understood that the particular shape of the members is not critical to the structure of the platform so long as it has sufficient strength to handle the load. Arms 22 are provided with apertures 36 which engage the inferior plow frame pins 24.

Figure 5:
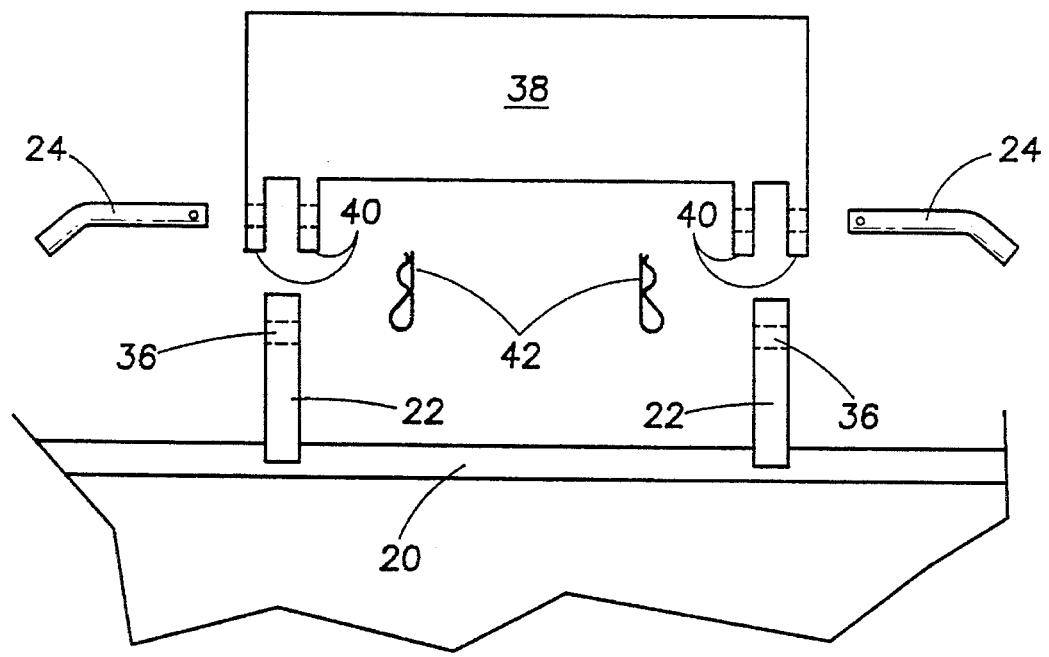
FIG. 5 is a plan view of the inferior connecting system.

Concerning FIG. 5, the inferior plow frame pusher bar is represented at 38 without showing the conventional arms that connect it to the vehicle frame. Ears 40 extend from the pusher bar and accept arms 22 which are engaged and secured by pins 24 which are in turn held in place by cotter pins 42.

Figure 6:
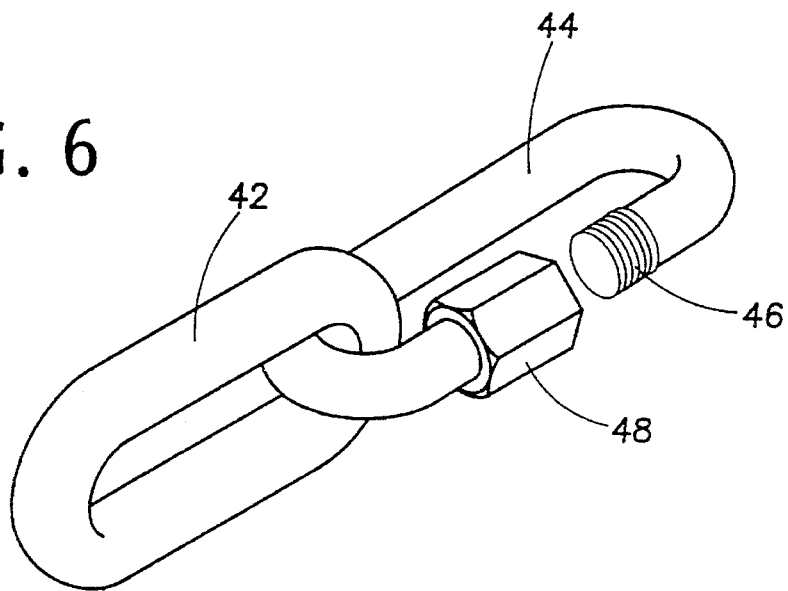
FIG. 6 is a perspective view of a threaded connecting link of a type suitable for use in the invention.

FIG. 6 shows an example of a chain link 42 from the support chain 26 and a threaded connector link 44 including threads 46 to accept engagement with the nut 48. The connector links will connect the chains 26 to the frame connector apertures 28 and the superior plow frame apertures 30.

It should be understood, of course, that the foregoing disclosure relates to only a preferred embodiment of the invention and that numerous modifications of alterations may be made therein without departing from the spirit and scope of the invention as set forth in the appended claims.

What is claimed is:

1. A load carrying platform for a vehicle equipped with a snow plow frame, said snow plow frame adapted to selectively support a snow plow blade therefrom and having an upper frame portion and a lower frame portion, said platform adapted to be selectively supported by said snow plow frame when said snow plow blade is not supported therefrom, said platform comprising:

a rectangular platform frame having a frame length equal to or less than the width of the vehicle and having a frame width less than the frame length;

arm means connected on a proximal side of the platform frame adapted to mate with connecting means located on the lower frame portion;

support means comprising chain links for connecting a distal side of the platform frame to the upper frame portion;

a plurality of frame supporting means connected in a spaced relation to an underside of the platform frame for supporting the platform frame;

said arm means being positioned on the proximal side of the platform frame such that said underside is in an elevated position relative to said connecting means, said arm means comprising aperture means, said connecting means comprising a pin means adapted to be inserted through said aperture means for connecting said platform frame in a hinged relation relative to said snow plow frame; and a plurality of apertures spaced about the platform frame for receiving load strapping hooks.

2. The load carrying platform according to claim 1 wherein said support means further comprising threaded connector links on end portions thereof adapted for insertion into an aperture on said distal side of said platform and an aperture on said upper frame portion, respectively, to facilitate connection thereof.

\* \* \* \* \*